US00RE38138E

(19) United States
(12) Reissued Patent
Holkeboer et al.

(10) Patent Number: US RE38,138 E
(45) Date of Reissued Patent: Jun. 10, 2003

(54) METHOD FOR LINEARIZATION OF ION CURRENTS IN A QUADRUPOLE MASS ANALYZER

(75) Inventors: David H. Holkeboer, Byron Center, MI (US); Robert E. Ellefson, Manlius, NY (US)

(73) Assignee: Leybold Inficon, Inc., East Syracuse, NY (US)

(21) Appl. No.: 09/686,194

(22) Filed: Oct. 6, 2000

Related U.S. Patent Documents

Reissue of:
(64) Patent No.: 5,889,281
Issued: Mar. 30, 1999
Appl. No.: 08/891,695
Filed: Jul. 11, 1997

U.S. Applications:
(60) Provisional application No. 60/041,027, filed on Mar. 21, 1997.

(51) Int. Cl.[7] ..... H01J 49/40
(52) U.S. Cl. ..... 250/282; 250/287; 250/288
(58) Field of Search ..... 250/282, 281, 250/288, 283, 423 R, 287

(56) References Cited

U.S. PATENT DOCUMENTS 3,974,380 A * 8/1976 Rettinghaus et al. ..... 250/288

OTHER PUBLICATIONS

*International Journal of Mass Spectrometry and Ion Processes,* "Improvements to Small Quadrupole Mass Spectrometers", Batey pp 117–126 (1984).

* cited by examiner

*Primary Examiner*—Kiet T. Nguyen
(74) *Attorney, Agent, or Firm*—Wall Marjama & Bilinski LLP

(57) ABSTRACT

A method for linearizing the sensitivity of a quadrupole mass spectrometric system to allow the sensor to more accurately report partial pressures of a gas in high pressure areas in which the reported data is effected by a number of loss mechanisms. According to the invention, correction factors can be applied empirically or software in a quadrupole mass analyzer system can be equipped with correcting software to expand the useful range of the mass spectrometer.

10 Claims, 7 Drawing Sheets

METHOD FOR LINEARIZATION OF ION CURRENTS IN A QUADRUPOLE MASS ANALYZER

Matter enclosed in heavy brackets [ ] appears in the original patent but forms no part of this reissue specification; matter printed in italics indicates the additions made by reissue.

This application is based on a Provisional Application of U.S. Application No. 60/041,027 filed Mar. 21, 1997.

FIELD OF THE INVENTION

The invention relates to the field of quadrupole mass analyzers, and more specifically to a method of linearizing ion currents in a quadrupole gas analyzer.

BACKGROUND OF THE INVENTION

Mass spectrometers include instruments which ionize a gas sample, separate a resulting beam of ions by mass to charge ratio, and then detect filtered ions as an electrical signal. The masses, unique for each substance, identifies the gas molecules from which the ions were created. One such mass filter used is referred to a quadrupole which consists of four parallel electrodes or poles arranged in a square array. Opposite poles are connected together electrically such that an electric field of hyperbolic geometry is produced. Potentials applied to these poles are a superposition of variable DC and RF voltages, generally of a fixed RF frequency.

The above instrument works preferably in a high vacuum environment because the ions, once created, must not collide with other gas molecules as the molecules move through the instrument; otherwise some molecules may not be detected. High vacuum means pressures below 1.3E-2 Pascals, or greater, or approximately 1-0E-4 torr.

It has been determined that the transmission of ions in a quadrupole mass spectrometer suffers losses in the high operating pressure area due to several effects; most notably from collisions between ions and neutral gas molecules, ion scattering and coulombic repulsion. The above effects results in a perceived non-linearity between pressure and ion current. It would be desirable to provide a sensor which could correct such non-linear deficiencies, or alternately to provide a technique for correcting measured ion current data to expand the performance of a quadrupole mass analyzer in a higher pressure regime than currently available.

SUMMARY OF THE INVENTION

A primary object of the present invention is to extend the linearization of an ion detector in a mass quadrupole sensor system over higher pressures than similar analyzers of the prior art.

Another primary object of the present invention is to be able to correct ion current data over an increased range of gas pressures to take into account the effects of ions at higher pressures.

Therefore, and according to a preferred aspect of the present invention, there is provided a method for correcting a measurement of a partial pressure in a mass spectrometer measuring both a measured partial pressure and a measured total pressure in the millitorr range of a high vacuum, the method comprising the steps of:

measuring a total pressure ion current to obtain a measured total pressure ion current;

determining, based on said measured total pressure ion current, said measured total pressure;

measuring a partial pressure ion current to obtain a measured partial pressure ion current;

determining a correction factor based on said measured total pressure ion current; and correcting, using said correction factor, said measured partial pressure to obtain a corrected partial pressure.

Preferably, correction factors can be applied to extend the pressure range for linear partial pressure measurement from the mass analyzed ion current by scaling the measured ion current with a pressure dependent or an ion intensity dependent scaling factor.

More preferably, the pressure dependent correction factor may have a known functional dependence due to scattering of ions out of the detected beam over the path length of the ion, a loss determinable by the relation:

$$I_{corrected}=I_m^{+}*e^{bP}$$

in which $I_m^{+}$ is the measured ion current corrected by an empirically determined constant, b and P is the total pressure.

The pressure dependent factor may have another component due to non-gas scattering while another correction factor dependent on ion density can also be determined from measured deviations from linear response. Each of the correction factors can be empirically or mathematically determined dependent on the measured ion current, the total gas pressure and/or the ion density.

An advantage of the present invention is that a linearization factor can be applied to extend the pressure range of a gas analyzer.

Another advantage of the present invention is that each correction factor can be directly applied using software contained in a suitable gas analysis system, or alternately applied using interpolation tables or calculated and applied directly to empirical data.

Other objects, features and advantages of the present invention will become apparent from the following description read in conjunction with the accompanying drawings, in which like reference numerals designate the same elements.

DETAILED DESCRIPTION OF THE INVENTION

The following description relates to a specific gas analysis sensor system using the present method to define a correction factor for use at high pressures. It will be readily apparent, however, to one of sufficient skill in the field that the concepts herein described are applicable in other suitable systems.

Figure 1:
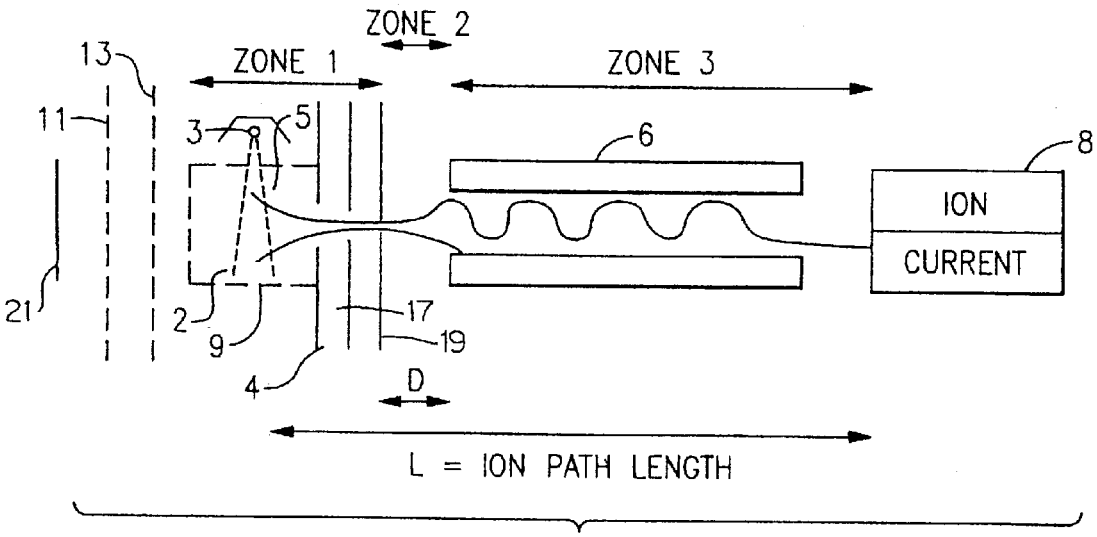
FIG. 1 is a partial schematic diagram of a mass analyzer to which the present method of the invention can be applied.

Referring to the Figures and specifically to FIG. 1, a quadrupole mass spectrometer 10 includes an ion source 2, a quadrupole mass filter 6, and an ion detector 8 each arranged in a housing (not shown). The ion source 2 according to this embodiment includes an electron emitter 3, such as a heated filament and an ion lens assembly 4. Electrons formed by the heated filament are expelled into an ionization volume 5 having a defined anode 9. The potential in the anode 9 is positive with respect to an electron repeller (not shown).

The ions formed within the confines of the ionization volume 5 are pulled away by opposite potential provided to the ion lens assembly 6 and formed into a beam. The ion lens assembly 4 includes a series of concentric plates or discs including a focus plate 17 having an opposite potential relative to the anode 9 which serves to accelerate the formed ions by manipulation of the electric field, thereby serving to focus the ion beam into the hole in an adjacent source exit lens. In this instance, and to attract positive ions, the focus plate 17 is biased negatively with respect to the anode 9.

The potential in a source exit lens 19 is also negative with respect to the anode 9. Part of the ion beam passes through a hole in the exit lens 19 and is injected into the quadrupole mass filter 6. The remaining portion of the beam strikes the interior of the exit lens and is neutralized, resulting in a current flow. The magnitude of this current is related to the pressure in the ion source 2, as described below, as can therefore be used as a measure of the total pressure. Alternately, a total pressure collector 11 (shown in phantom) can be provided at an opposite end of the ion source 2, using a focus plate 13 (also in phantom) which similarly converges a secondary ion beam for directing onto an ion collecting surface 21.

The total pressure collector 1 calculates the total pressure of the gas mixture of interest. As defined by Dalton's Law, the sum of the partial pressures is equal to the total gas pressure of the mixture. The total pressure collector 11 is calibrated, typically using a calibrated vacuum gauge 30, FIG. 4, in a manner which is commonly known to those in the field. Additional details relating to a dual ion source, as described, are provided in copending and commonly assigned U.S. application Ser. No. 08/642,479 [Attorney Docket 247_096], filed May 3, 1996, the entire contents of which are herein incorporated by reference.

Referring back to FIG. 1, the ions produced in the ion source 2 are injected as a focused beam into the quadrupole mass filter 6, which rejects all of the ions with the exception of those with a specific mass-to-charge ratio. Most ions contain only one unit of charge. The quadrupole mass filter 6 contains four elongated rods (not shown) formed in a square array which are alternately charged to direct ions of specific masses down through the center, and deflecting all larger and smaller masses into the poles before those ions can traverse the length of the filter. The distance between the center of the square array (not shown) and the closest rod surface (not shown) is known as the quadrupole radius. Ideally, each of the rods has a hyperbolic shape.

Oppositely arranged rods of the quadrupole mass filter 6 are electrically connected together. The ions are directed into the space between the poles in a direction nominally parallel to the length dimension of the rods. There the ions are separated according to their mass-to-charge ratio by the lateral forces resulting from the potentials applied to the poles.

The applied potential consists of an RF component and a DC component. The RF potential on one set of rods is 180 degrees out of phase with respect to the other set of rods, but of the same amplitude. The DC and RF potentials are referenced to a center voltage (sometimes referred to as the pole zero).

The RF component removes the low-mass ions from the electron beam. Ions of sufficiently low mass have their motions remain in phase with that of the applied RF. These ions will gain energy from the field and oscillate with increasingly larger amplitudes. Eventually, as they travel along the length of the rods, these ions will strike one of the rods, and be neutralized. On the other hand, high-mass ions are focused by the RF component to an area close to the quadrupole's long axis. The DC component is superimposed on the RF to remove high-mass ions from the beam.

By an appropriate DC to RF ratio, the quadrupole mass filter can be made to discriminate against both high and low-mass ions to a desired degree. According to this embodiment, ions having masses between 2 and 44 amu are allowed to pass therethrough, while ions having higher and lower masses are rejected, as well as secondary electrons which are created in the anode 9 during the formation of the convergent ion beam.

The ion detector 8 according to this embodiment (not shown) can be a simple Faraday cup, an electron multiplier, or a combination of each. Additional details relating to the quadrupole mass filter, the ion detector, as well as other primary components of a specific quadrupole gas analysis system are provided in TRANSPECTOR Gas Analysis System Manual, published March, 1997, by Leybold Inficon, Inc., the entire contents of which are herein incorporated by reference.

Figure 3:
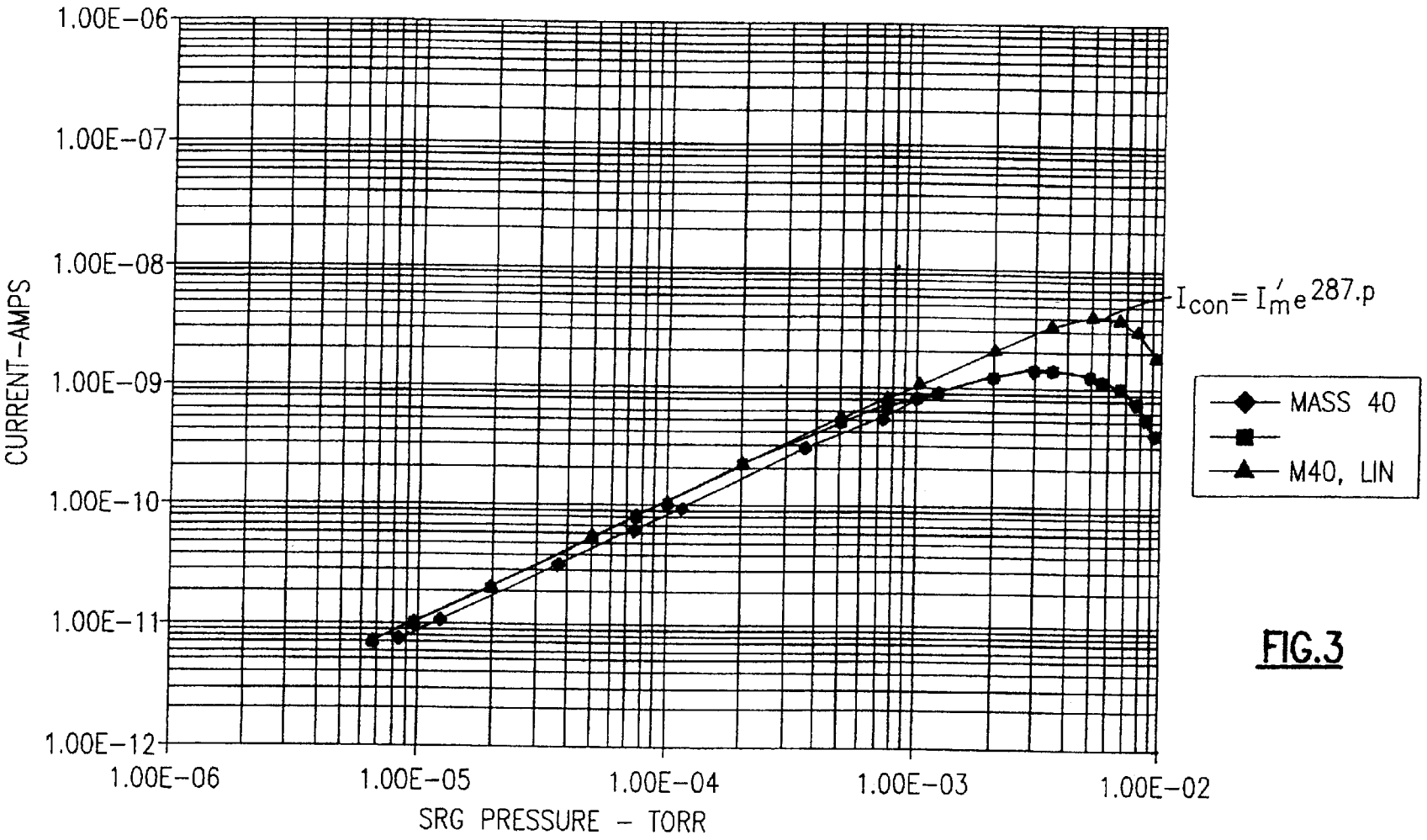
FIG. 3 is a graphical representation of ion current versus process pressure indicating the non-linearity of ion current over the same pressure range depicted in FIG. 2, and illustrating a corrected curve at higher pressure levels.

In use, the above device is used over a range of vacuum pressures and a mass spectrum can be obtained for a gas mixture which is retained and ionized in the ionization volume. More specifically, a range of masses are output along with the ion current which can be graphically displayed as the mass spectrum shown in FIG. 3.

With the above background and description of an appropriate gas analysis system, it can now be remarked that ion transmission for such a system suffers losses in the high operating pressure range (millitorr range) due to a number of discrete loss mechanisms. Each of the loss mechanisms will now be briefly described by reference to FIG. 1, in which three distinct zones each affect the transmission of ions to the ion detector.

In Zone I, a buildup of positive ions changes a transmission factor T1 of ions out of the ion source 2, as shown by the following equation:

$$T1=F1(i_1^+ P, IE, V_{focus}, i_e) \quad (1)$$

in which F1 is a function, $i_1^+$ equals the positive ion density which is proportional to P, the sample gas pressure; IE, the ion energy; $V_{focus}$, the focus potential; and $i_e$ the electron current density. Parameters such as IE, $V_{focus}$, and $i_e$ can be held constant, but the value of $i_1^+$ is proportional to P. Thus, a practical modeling of the ion source 2 yields the functional variation of transmission T1 as T1=F1(P).

In Zone II, which includes the region between the ion lens assembly 4 and the quadrupole mass filter 6, the transmission factor is T2, which is represented as:

$$T2=F2(i_2^+, IE, V_{focus}, D) \quad (2)$$

where $i_2^+$ is the ion current density exiting the ion source 2, IE equals the ion energy defining the ion velocity component along the long axis of the quadrupole mass filter 6, $V_{focus}$ is the focus potential which affects the radial velocity components, and D is the separation distance between the ion source 2 and the quadrupole mass filter 6. These parameters each define the position and range of angles of the positive ions entering the quadrupole mass filter 6. Ion current density $i_2^+$ is a function of P, the pressure of the sample gas. The variable portion of T2 is primarily altered by high pressures in which the associated ion current density is large and coulomb repulsion is possible within the drift distance, D. Thus, T2=F2(P).

In Zone III, which is the drift region of ions transmitted through the quadrupole mass filter 6 to the ion detector 8, the transmission factor is T3. The functional dependence of T3 is:

$$T3=F3(i_m^+, \lambda, L) \tag{3}$$

in which: $I_m^+$ equals the ion current of the transmitted mass, $\lambda$ is the mean free path of the ion in the gas having pressure P, and L is the path length of the ion of mass m from creation in the ion source 2 through the quadrupole mass filter 6 to the ion detector 8. That is, L extends through Zones I, II, and III. The transmission variation is specifically affected by collisional losses due to ion-gas scattering and the potential for coulomb repulsion of intense ion beams within quadrupole mass filter 6. As relating to the first factor, the interaction of ions with ambient gas molecules is described by the mean-free-path property of the gas environment. The mean-free-path is the average distance that an ion travels before interacting with a gas molecule. The value of the mean-free-path is dependent on the type of ion, the type of gas atmosphere, and the gas pressure:

$$\lambda=K/P \tag{4}$$

in which: $\lambda$ is the mean-free-path, K is a constant depending on the ion and gas species, and P is the pressure of the gas.

The mean-free-path grows proportionally shorter as the gas pressure in the mass spectrometer 10 increases. The effect of collisions of ions with the gas molecules is to prevent the ions from reaching ion detector 8 and being measured. Thus the output of mass spectrometer 10 is no longer directly proportional to the concentration of the gas species being measured.

The fraction of ion current that is lost is predictable. The fraction of ions that are able to travel a distance l in a gas is given by:

$$\frac{n}{n_0} = \exp\left(-\frac{l}{\lambda}\right) \tag{5}$$

where n is the remaining number of ions, $n_o$ is the original number of ions, and $\lambda$ is the mean-free-path. Therefore, $$\frac{n}{n_0} = \exp(-KPl) \tag{6}$$

and the fraction of ions in the ion beam traveling from ion source 2 decreases with increasing pressure and increasing length of the ion path. Thus, T3 can be summarized as:

$$T3=e^{-L/\lambda}*F3(I_m^+ X_m*P)=e^{-PKL}*F3(I_m^+) \tag{7}$$

in which $X_m$ equals the moles of gas species of mass m in total gas pressure P.

The cumulative transmission factor for any ion of mass m is the product of the zone factors T1, T2, and T3:

$$T_{total}=T1*T2*T3=e^{-PKL}*F1(P)*F2(P)*F3(P)= e^{-PKL}*F(P)*F3(I_m^+) \tag{8}$$

Measured ion currents (the rate of flow of electrical charge associated with the flow of ions), are related to partial pressure (the pressure of a specific chemical component of a gas mixture) by the general operating equation:

$$PP_m=I_m^+/S_m \tag{9}$$

where $PP_m$ is the partial pressure of a component of the gas mixture having mass m, $I_m^+$ is the measured ion current, and $S_m$ is the sensitivity (measured in amps/torr) for the component of mass m.

Sensitivity is the ratio of ion current at a specified mass from a specified gas to the partial pressure of that gas, suitably corrected for background. The specified gas is typically nitrogen, measured at 28 amu, though argon at 40 amu is sometimes also used, depending on the gas analyzer instrument used.

Figure 2:
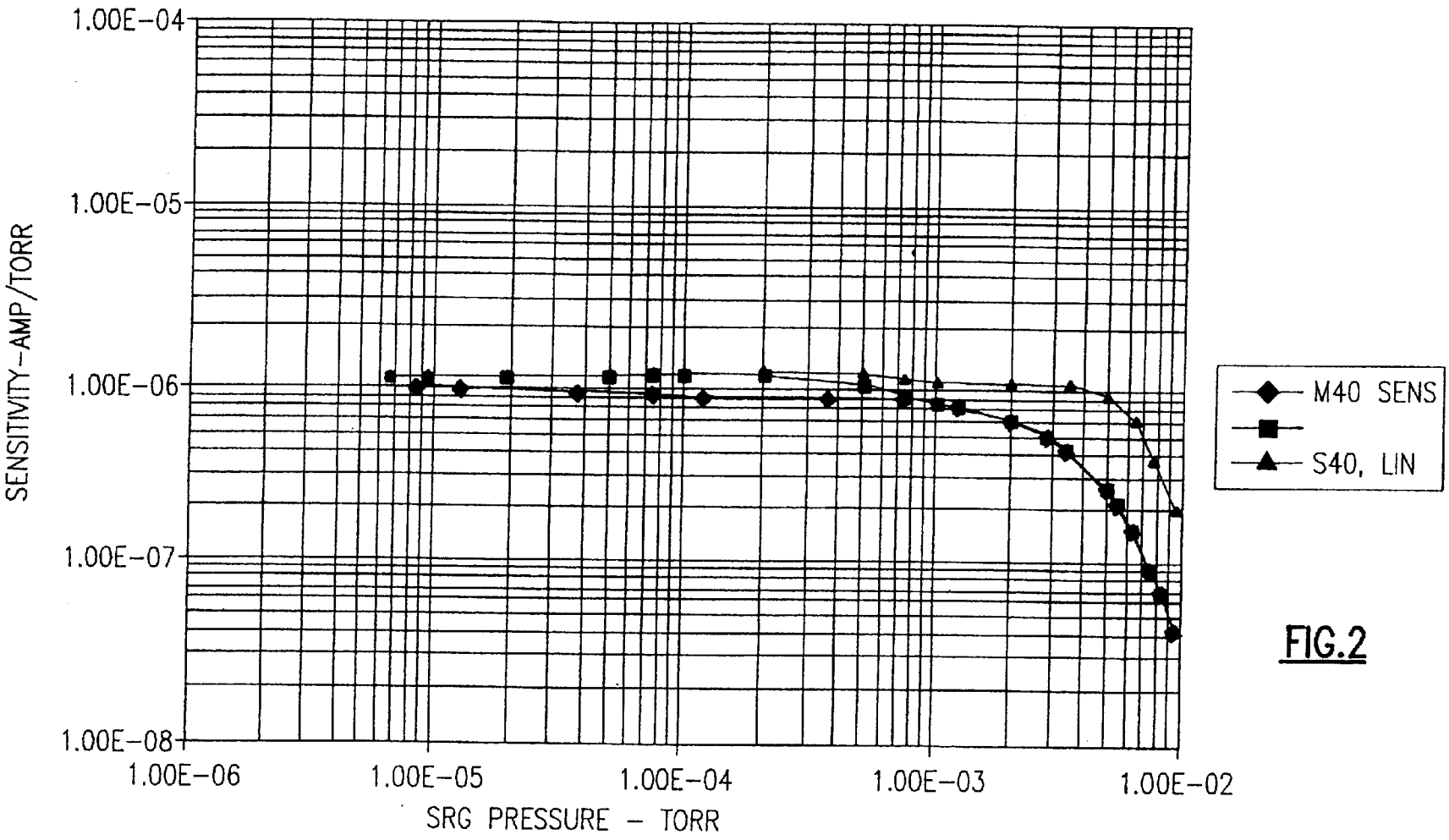
FIG. 2 is a graphical representation indicating the non-linearity of sensitivity versus process pressure and illustrating a corrected curve derived in accordance with a method according to the present invention.

Referring to FIG. 2, a linear response of the partial pressure gas analyzer occurs over the pressure range in which $S_m$ is a constant. Non-linearity is exhibited by deviation of $S_m$ from a constant value as depicted by the response labeled "M40 Sens" in FIG. 2 for pressures greater than $5\times10^{-4}$ torr. Deviation from linearity is due to the variation of ion transmission with pressure for the true ion current, $I_{m,o}^+$. This is represented as:

$$PP_m=I_{m,o}^+/S_m=[I_m^+/T_{total}]/S_m=[I_m^+*e^{PKL}*F^{-1}(P)*F^{-1}(I_m^+)]/S_m \tag{10}$$

where $F^{-1}(P)=1/F(P)$ and $F^{-1}(I_m^+)=1/F3(I_m^+)$.

The objective of the linearization of the ion current is to apply correction factors to the measured ion current (the relation between the brackets) to extend the calibration for partial pressure measurement to higher pressures. A linearized ion current, $I_{corrected}$, can be calculated from measured parameters $I_m^+$ and P using the relation:

$$I_{corrected}=I_m^+*e^{PKL}*F^{-1}(P)*F^{-1}(I_m^+) \tag{11}$$

The factor KL can be determined from empirical measurements of ion current changes at least two different pressures, as described below, and the functional dependencies of $F^{-1}(P)$ and $F^{-1}(I_m^+)$ are separately determined if known. A functional fit of F(P) can also be completed.

Based on the above discussion, extending the pressure range for linear partial pressure measurement from the mass analyzed ion current of a mass spectrometer can be accomplished by scaling the measured ion current with a pressure dependent or ion intensity dependent scaling factor:

$$I_{corrected}=I_m^+*F^{-1}(P)*F^{-1}(I_m^+) \tag{12}$$

The pressure dependent correction factor may have a known functional dependence, such as, for example, the exponential loss of ion current at a given pressure due to scattering of the ion out of the detected beam over the path length of the ion. Thus, a known functional correction for this loss by scattering is:

$$I_{corrected}=I_m^+*e^{bP} \tag{13}$$

where b is an empirically determined constant and P is the local gas pressure that the ions travel through. P is preferably independently measured by a total pressure gauge.

Referring to FIG. 1, the determination of KL or b (equations 11, 13) to determine the number of ions lost or deflected from the exit device or detector due to collisions with molecules of the neutral gas can be determined as follows:

The number of ions lost per unit length of gas passage is:

$$dI=-K_L PIdL \tag{14}$$

in which:

I=ion current

P=gas pressure

L=length dimension $K_L$=loss constant

By separating variables, the above equation can be solved by integrating:

$$\int_{I_F}^{I_R} \frac{dI}{I} = \int_0^L K_L P dL \tag{15}$$

to yield the following:

$$\ln\left(\frac{I_R}{IF}\right) = K_L P_L \tag{16}$$

in which:

$I_R$=ion current remaining at the exit, $I_F$=ion current formed by the ion source The current formed by the ion source and injected into the gas volume is proportional to the gas pressure:

$$I_F = K_F P \tag{17}$$

in which $K_F$=the ion formation constant.

In addition, the sensitivity (S) exhibited at the output is defined as:

$$S = \frac{I_R}{P} \tag{18}$$

Combining equations (16), (17), and (18) yields:

$$\ln(S) = K_L PL + \ln(K_F) \tag{19}$$

Equation (19) denotes a linear relationship between ln(S) and P. The slope of the line relating ln(S) and P indicates the degree of loss and the intercept is the logarithm of low pressure sensitivity. Thus, the slope is a numerical measure of the non-linearity.

The sensitivity loss factor, if known, can be used to calculate the full ion current corresponding to the observed ion current remaining after loss by the above described loss mechanism. First, for generality a distinction is made between the total pressure for all gas components (P) and the partial pressure ($P_P$) of a given component. Equation (16) properly relates to total pressure, while equations (17) and (18) can also be used for partial pressures.

Equation (19) can therefore be rewritten as:

$$\ln\left(\frac{I_R}{P_P}\right) = mP + \ln\left(\frac{I_F}{P_P}\right) \tag{20}$$

This equation can also be rewritten as:

$$I_F = I_R e^{-mP} \tag{21}$$

in which it should be recognized that m has a negative value, and whereby:

in which it should be recognized that m has a negative value, and whereby:

$$-m = KL = b \tag{22}$$

A method of determining a correction factor is now described with reference to the system illustrated in FIG. 4 utilizing an argon gas (mass=40 amu) at a specified electron energy (40 eV). The system includes a sensor 34 generally as described according to FIG. 1, and further includes a calibrated total pressure gauge 30 aligned with a vacuum test chamber 32 defining the ionization volume 9, FIG. 1, as previously described and including a gas inlet with a controlling valve 38 to admit a prescribed amount of substantially pure argon gas from a source 40, according to this embodiment, into the test chamber. The sensor 34, including the quadrupole mass sensor 6, FIG. 1, and ion detector 8, FIG. 1, is arranged relative to the vacuum test chamber 32 and a vacuum pump 36 in a manner commonly known.

Initially, the total pressure gauge 30 is calibrated at the specific electron energy. As noted and according to this embodiment, a value of 40 electron volts is suitable. A low pressure calibration set point is also established, $3\times10^{-6}$ torr-Ar according to this embodiment, by adjusting the Ar flow valve and recording the reading using a calibrated reference gauge, not shown.

A high pressure calibration setting at $5\times10^{-3}$ torr-Ar is then similarly established by adjusting the Ar flow valve and recording the reading using the calibrated reference gauge. Utilizing these values, the linearization factor at higher pressures can be determined as follows:

First, the background pressure is measured. Using the sensor 34, the mass (40) ion current is measured at the background pressure and at the defined electron energy of 40 electron volts using a defined focus potential of approximately 16 eV. According to this embodiment, the background pressure is then increased by $10^{-4}$ torr-Ar to obtain a first test pressure. The mass (40) ion current is then measured at the first test pressure and at 40 electron volts.

The sensitivity S can then be calculated using the relation: $[I(\mathbf{40})I_0(\mathbf{40})]/[P_{test}-P_0]$ The target ion current at 5 mtorr-Ar is then calculated using $I_{expected}=S*5\times10^{-3}$torr. S=sensitivity from step e.

The pressure is then adjusted to a second test pressure. According to this embodiment the second test pressure is 5 mtorr.

The ion current at mass (40) is measured and the calibration Linearization Constant K is adjusted such that the measured ion current ($I_m$) equals the target ion current.

EXAMPLE 1

Figure 4:
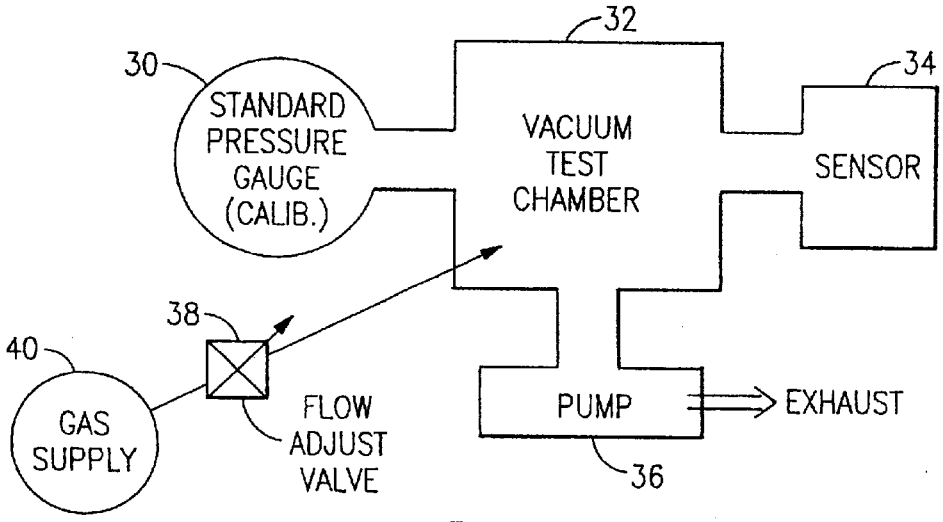
FIG. 4 is a schematic diagram of a gas analysis system useful in the linearizing method according to the present invention.

The following example relates to a correction for linearization of ion current for a gas sample of nitrogen using a quadrupole sensing apparatus as illustrated in FIG. 1 or FIG. 4.

The sensor output signals conducted at 500, 200, and 100 microamp emission currents, were linearized using the above described mathematical relationship. The linearity generated from the tests are shown in FIGS. 5–9.

Figure 5:
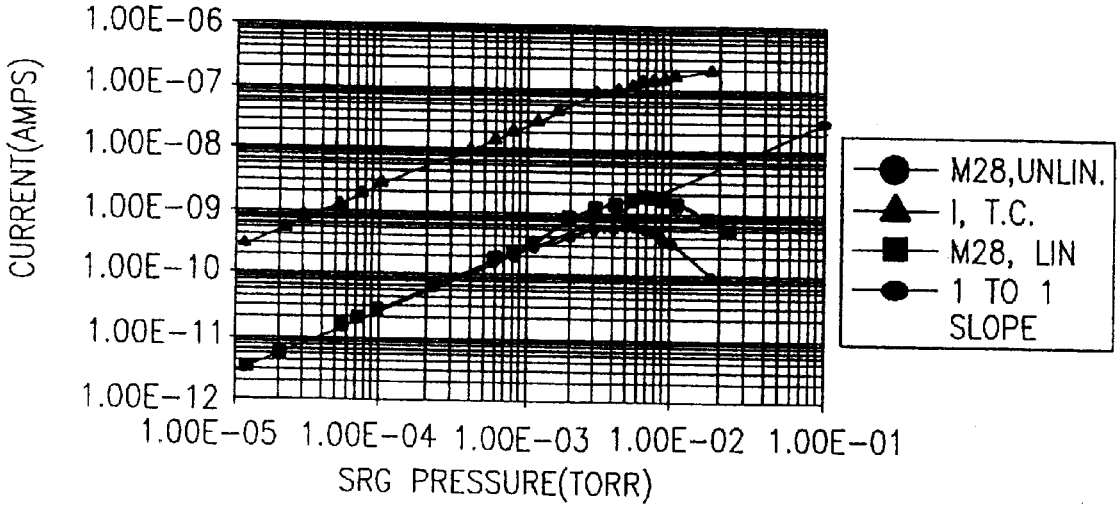
FIGS. 5–9 are graphical representations of specific high pressure linearizations using the system of FIG. 4 in accordance with the method according to the present invention.

From FIG. 5, the curve labeled M28, UNLIN represents the normal nitrogen linearity of the sensor system shown in FIG. 1. At 500 microamp emission, the unlinearized mass 28 signal begins to deteriorate from a linear (1:1) relationship at approximately 3×10–4 torr, with the signal becoming flat at approximately 4 mtorr.

The total ion source current (labeled ITC) curve is used to calculate the total ion source pressure at each pressure setting. The ion source pressure is determined in the following manner. The sensitivity (S) at each pressure setting is calculated by measuring the partial pressure and the current per equation (18), and the sensitivity numbers for all of the data points are averaged together. The average sensitivity is then used to calculate the ion pressure by dividing the ion pressure current at each point by the average sensitivity.

The Mass 28, LIN curve is the mass (28) output that has been corrected using the above linearization equation. As shown in the FIG., the linearized mass 28 signal (LIN) rises slightly above a 1:1 relationship at approximately 3×10−4 torr and goes flat at approximately 6 mtorr.

Figure 6:
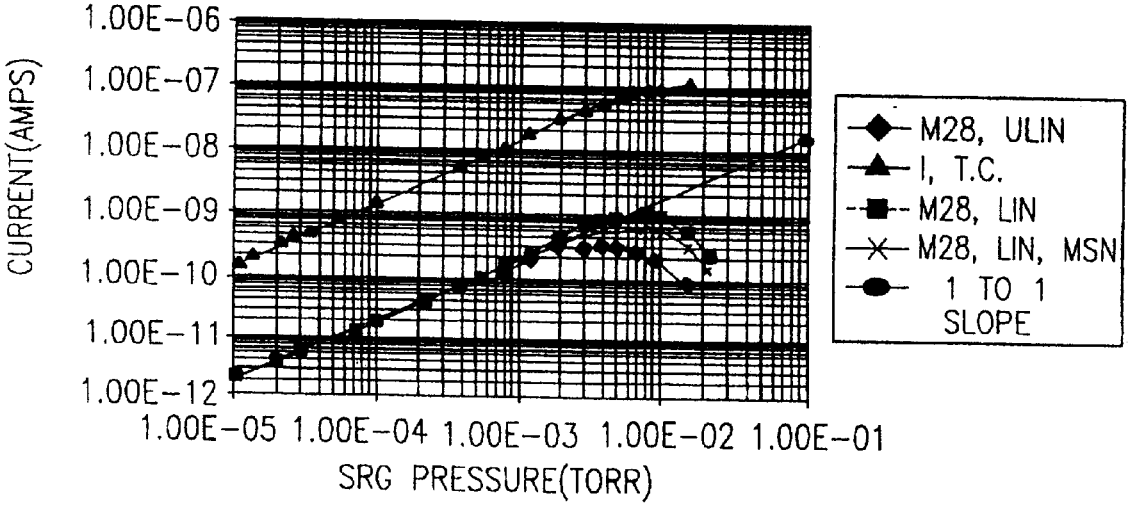
Figure 7:
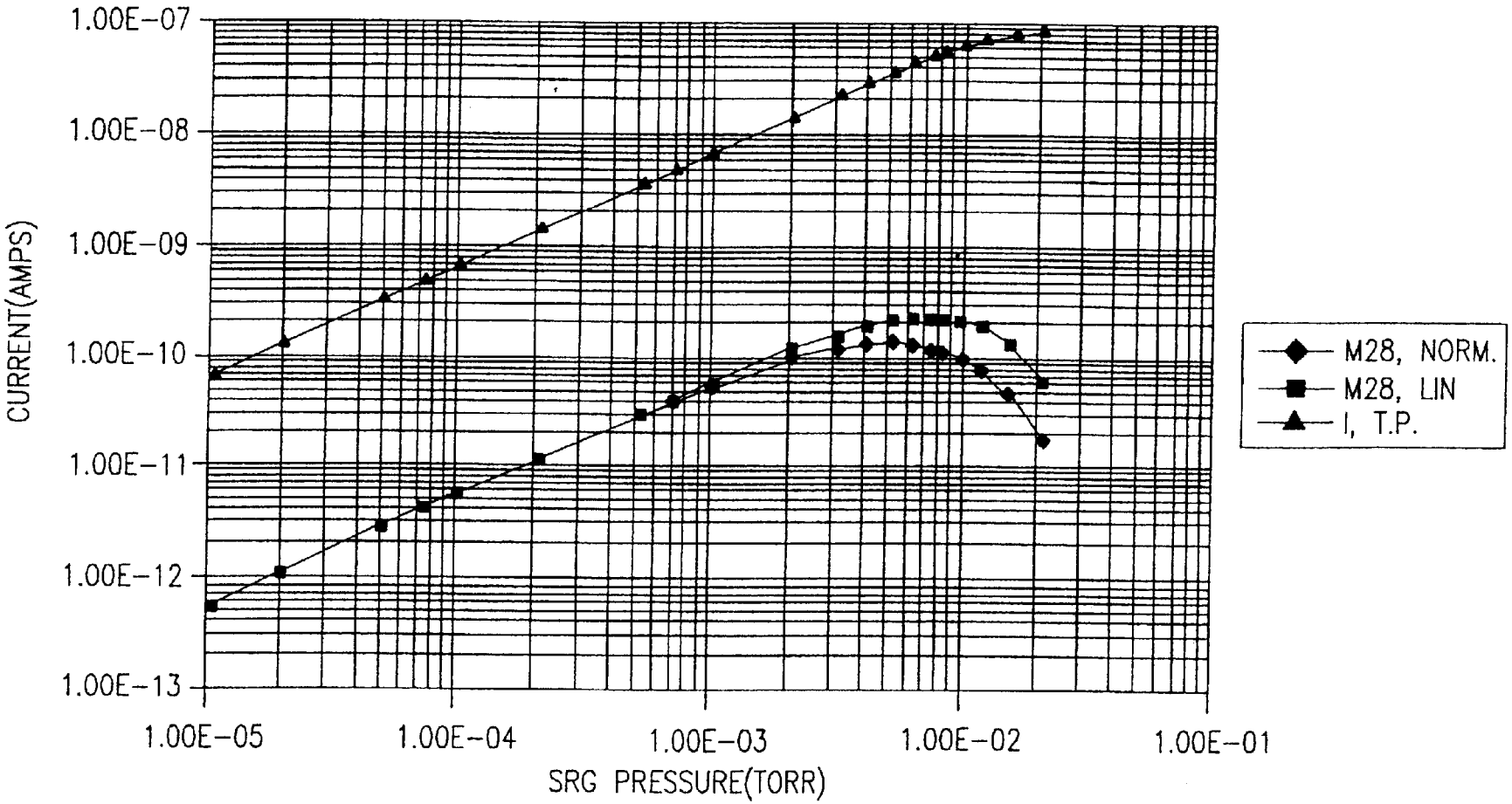

Similar corrections can be performed for 200 microamp and 100 microamp emissions in a similar graphical manner, as illustrated in FIGS. 6 and 7.

EXAMPLE 2

The output signals from a linearity test for a gas mixture were also linearized using the above mathematical relationship, that is using equation (21). The linearity for the test gas mix were conducted at an emission current of 100 microamps. The partial pressures (unlinearized) of the individual gas mix components detected by the gas sensor as plotted against total gas pressure is shown according to FIG. 8. The gas mix used for this specific linearization test is a standard mixture commonly used to tune RGA sensors. The gas mixture consists of the following components:

Hydrogen (M2), Helium (M4), Neon (M20), Nitrogen (M28), Argon (M40), Krypton (M84), and Xenon (not detectable due to setting of the quadrupole mass filter).

Figure 8:
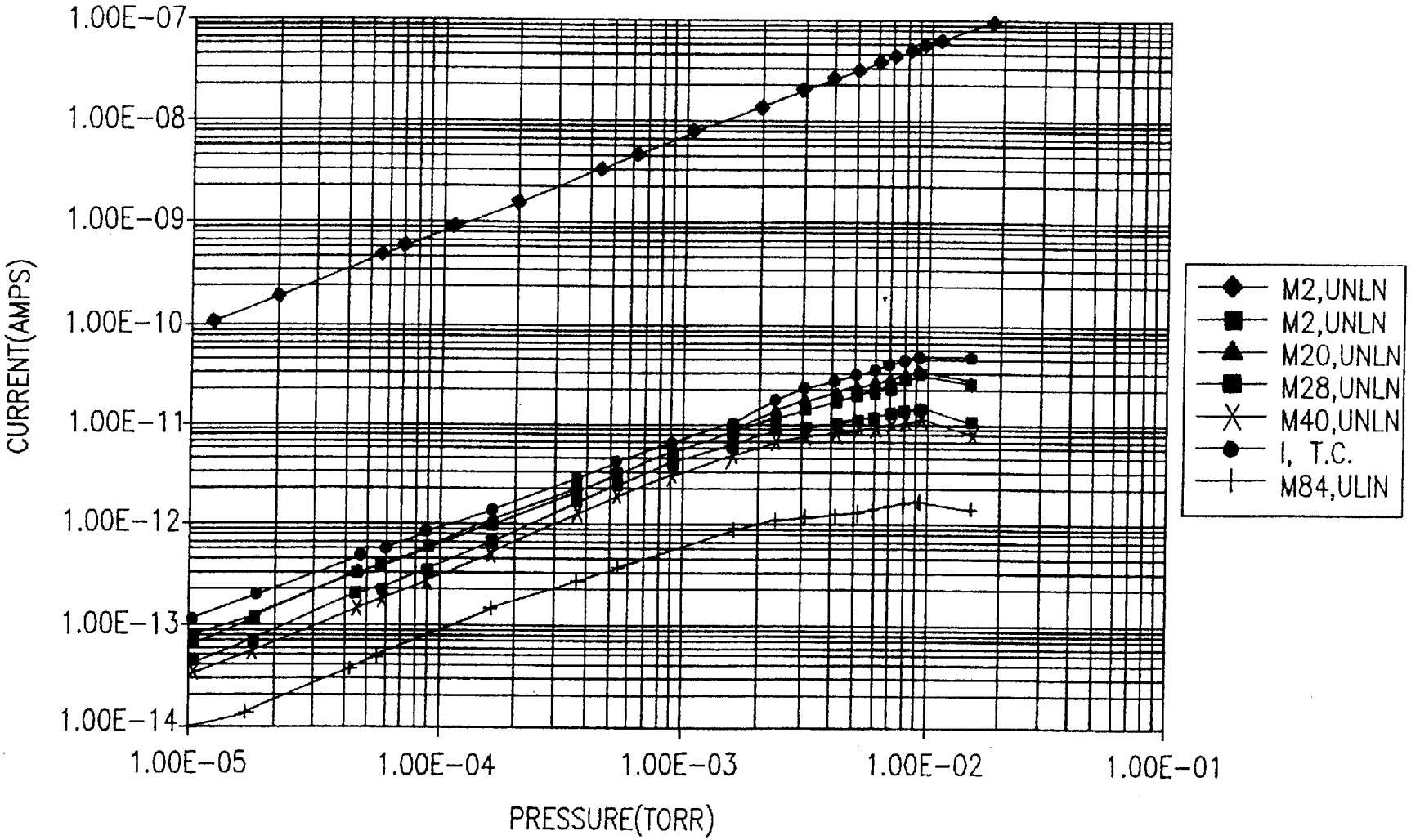

Referring to FIG. 8, the curve labeled M#, UNLIN illustrates the unlinearized output of the test mix components detected by the ion detector. The curve (ITC) represents the total ion source current detected at each pressure setting for the gas mix. The total ion current is used to calculate the ion source pressure of the gas mix at each pressure setting. All data points from the total ion source current curve were used to calculate the source pressures in the manner previously described.

Figure 9:
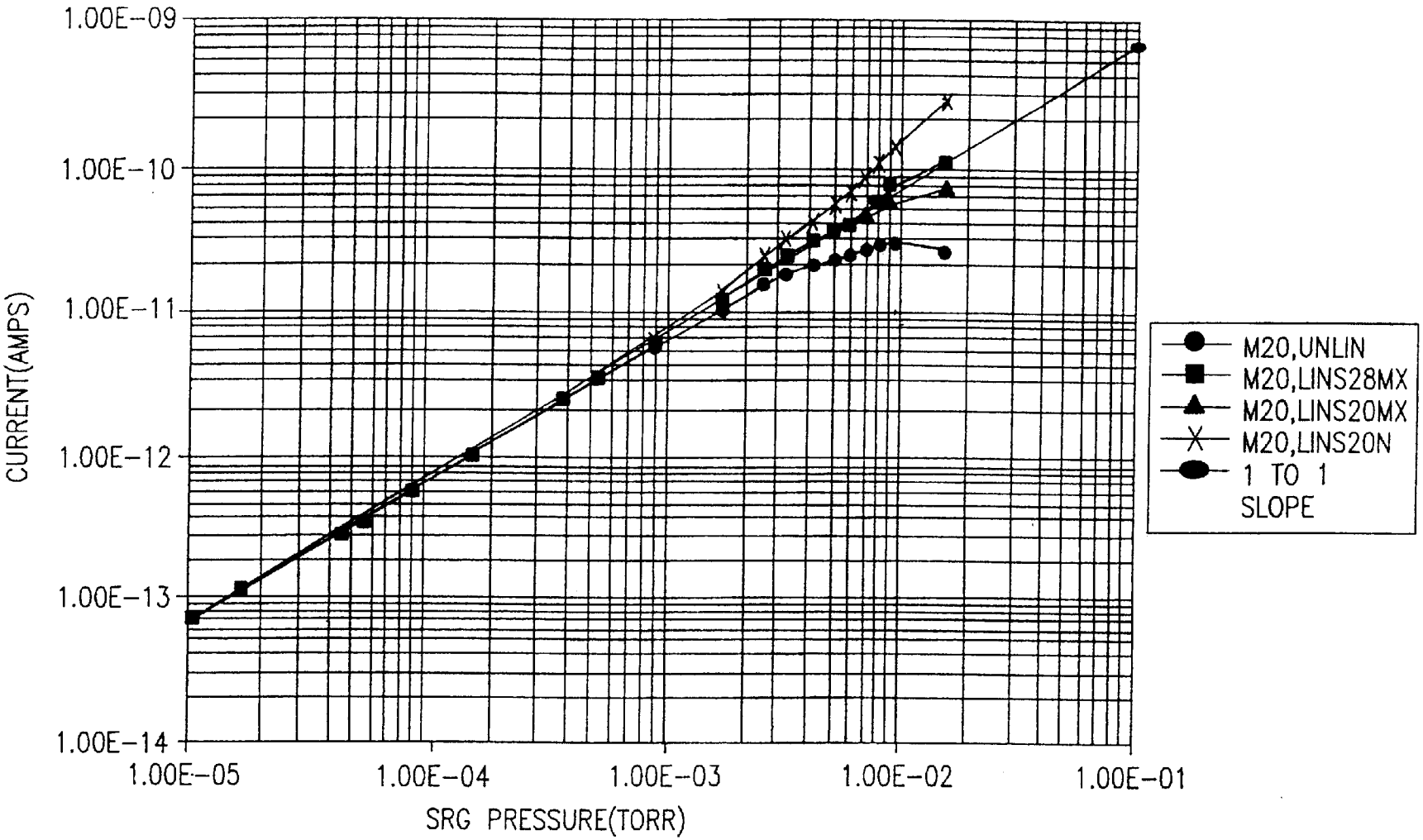

The output signals for the test mix components were linearized using the mathematical relationship above. FIG. 9 represents the linearity data for the mass (20) component of the test gas mix. This graph includes the unlinearized sensor output that was calculated using different slopes (from test mix and pure nitrogen) in the linearization equation.

The curve labeled M20, UNLIN illustrates the unlinearized output of mass (20) form the ion detector. The unlinearized (UNLIN) mass (20) signal begins to deteriorate from a linear (1:1) relationship (slope) at approximately 5e−4 torr, and the signal is flat at approximately 9 mtorr.

While the preceding discussion has been confined to the correction factor −mP, it should be realized referring to equation (11), that other loss effects are also present. A correction factor due to non-gas scattering total pressure effects can be determined from measured pressure dependent deviations from a linear response. The correction factor $F^{-1}(P)$ can be derived from a mathematical function or from an interpolated lookup table:

$$I_{corrected}=I_m^{+}*F^{-1}(P) \tag{23}$$

A correction factor due to coulomb repulsion at high ion current density can be determined from measured deviations from the linear response for intense ion beams compared with low intensity (minor components in the gas source) ion beam. The correction factor $F^{-1}(I_m^{+})$ can be derived from a mathematical function or from an interpolated lookup table dependent on the ion current measured $I_m^{+}$ as an indicator of current density:

$$I_{corrected}=I_m^{+}*F^{-1}(I_m^{+}) \tag{24}$$

The above can then calculate an overall linearization effect by combining each of the above factors by multiplying the factors together.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for correcting a measurement of a partial pressure in a mass spectrometer *system having means for* measuring [both] a measured partial pressure and *means for measuring* a measured total pressure in the millitorr range of a high vacuum, comprising the steps of:

measuring a total pressure ion current to obtain a measured total pressure ion current;

determining, based on said measured total pressure ion current, said measured total pressure;

measuring a partial pressure ion current to obtain a measured partial pressure;

determining a correction factor based on said measured total pressure ion current; and correcting, using said correction factor, said measured partial pressure to obtain a corrected partial pressure.

2. A method according to claim 1, wherein a correction factor due to ion beam scattering is determined based on the relationship:

$$I_{corrected}=I_{measured}e^{KLP}$$

in which $I_{corrected}$ is linearized ion current, $I_{measured}$ is measured ion current, K is a loss constant, L is the measured distance traveled by the ions through the mass spectrometer, and P is total sample gas pressure.

3. A method according to claim 2, wherein the correction factor $e^{PLK}$ is determined by measuring the slope of a line obtained by the graphical output of In(S) versus system total pressure; said slope being equal to KL and wherein:

$$S=\frac{I_m^{+}}{(PP_m)}$$

in which S=sensitivity which is equal to the ratio of ion current at a specified mass from a specific gas to the partial pressure of that gas, $(PP_m)$=partial pressure of a specified gas and $I_m^{+}$=measured ion current.

4. A method according to claim 1, wherein a correction factor based on non-gas scattering is determined by:

$$I_{corrected}=I_{measured}*F^{-1}(P)$$

wherein $I_{corrected}$ is the corrected ion current, $I_{measured}$ is ion current as measured by the mass spectrometer, and $F^{-1}(P)$ is a correction factor based on sample gas pressure.

5. A method according to claim 1, wherein a correction factor based on columbic repulsion is determined by:

$$I_{corrected}=I_{measured}*F^{-1}(I_m^{+})$$

in which $I_{corrected}$ is linearized ion current, $I_{measured}$ is the measured ion current measured by the mass spectrometer for a transmitted ion mass, and $F^{-1}$ is a correction factor which is dependent on ion current $(I_m^{+})$.

6. A method according to claim 1, wherein a total correction factor is determined based on the relationship:

$$CF_{TOTAL}=e^{PKL}*F_1(P)*F_2(I_m^{+})$$

in which

P=total pressure of gas

K=loss constant due to scattering

L=total ion distance traveled $F_1(P)$=pressure dependent correction factor due to non-gas scattering and $F_2(I_m^+)$=ion current correction factor due to columbic repulsion based on a measured positive ion current ($I_m^+$) for a transmitted ion mass, m.

*7. A method according to claim 1, wherein said partial pressure measuring means are disposed within said mass spectrometer.*

*8. A method according to claim 7, wherein said total pressure measuring means are disposed within said mass spectrometer.*

*9. A mass spectrometer system comprising:* a mass spectrometer;

means for measuring a partial pressure and a total pressure in the millitorr range of a high vacuum in said mass spectrometer; and means for correcting a measurement of a partial pressure using a correction factor based upon a measured total pressure ion current.

*10. A mass spectrometer system according to claim 9, in which said total pressure measuring means are contained within said mass spectrometer.*

* * * * *